United States Patent [19]

Huss et al.

[11] Patent Number: 4,903,216

[45] Date of Patent: Feb. 20, 1990

[54] METHOD FOR DISPLAYING INTERVISIBILITY DATA

[75] Inventors: Ronald E. Huss, Los Angeles, Calif.; Robert M. Denlinger, Henderson, Nebr.

[73] Assignee: Hughes Aircraft Company, Los Angeles, Calif.

[21] Appl. No.: 179,711

[22] Filed: Apr. 11, 1988

[51] Int. Cl.$^4$ .............................................. G09B 9/08
[52] U.S. Cl. ..................... 364/518; 340/747; 364/521; 434/43
[58] Field of Search ............................... 364/518–522; 340/721, 709, 734, 747, 727, 729; 342/64, 65; 434/43, 38, 40

[56] References Cited

U.S. PATENT DOCUMENTS

| | | | |
|---|---|---|---|
| 4,017,985 | 4/1977 | Heartz | 364/521 |
| 4,677,576 | 6/1987 | Berlin, Jr. et al. | 364/522 |
| 4,697,178 | 9/1987 | Heckel | 340/729 |
| 4,715,005 | 12/1987 | Heartz | 364/521 |
| 4,740,779 | 4/1988 | Cleary et al. | 340/705 |
| 4,766,555 | 8/1988 | Bennett | 364/518 |

Primary Examiner—Gary V. Harkcom
Assistant Examiner—H. R. Herndon
Attorney, Agent, or Firm—Leonard A. Alkov; W. K. Denson-Low

[57] ABSTRACT

A method for presenting intervisibility data relative to an observation point. A data base of terrain altitudes is stored in computer memory. The data base comprises terrain altitudes at a grid of points in a selected terrestrial area encompassing the observation point. Visible heights from the observation point at the grid points are derived from the data base with a computer by performing a number of steps grid point by grid point in succession in an order moving away from the observation point. The first step is to determine a projected height at the grid point from the visible heights between the observation point and the grid point. The second step is to compare the projected height with the terrain altitude at the grid point. The third step is select as the visible height at the grid point the larger of the compared terrain altitude and the projected height. A number representative of the visible height at each grid point as so derived with a computer is stored in computer memory. The computer memory is coupled to a visual display device to present the stored representations of the visible height in spatial relationship coordinated with the spatial relationship of the grid points of the terrestrial area. The visible height data is derived by use of the similar triangles theorem, and interpolation of previously calculated visible heights.

12 Claims, 3 Drawing Sheets

Fig. 6

| SUBROUTINE VMAP (ICOL, JROW, HOBS) |||
|---|---|---|
| OBSERVER'S POSITION (ICOL, JROW) IN DATA BASE |||
| OBSERVER'S HT. AGL = HOBS |||
| FIND HEIGHT OF OBSERVER (ZZ) |||
| SET MASKING DEPTH AT OBSERVER'S POSITION = 0 |||
| DO FIRST RIGHT, THEN LEFT |||
| | SET LIMIT OF COLUMN PROCESSING TO EDGE OF DATA BASE (ICLIM) ||
| | SET LIMIT OF VERTICAL COLUMN PROCESSING (JUP, JDN) ||
| | INITIALIZE INDICES OF WORKING ARRAY (MM, NN) ||
| | INITIALIZE PROJECTED HEIGHT TO LARGE NEGATIVE VALUE ||
| | SET ROW COUNTER (K=0) ||
| | PROCESS OBSERVER'S COLUMN GOING NORTH ||
| | DO J = JROW+1, JUP ||
| | | K=K+1 |
| | | IF (K.GT.1) THEN |
| | | TRUE — ELSE |
| | | ZP=ZP+(ZP-ZZ)/(K-1) — ZP=M(J,I) |
| | | IF PROJ. HT. .LT. TERRAIN HT. |
| | | TRUE — ELSE |
| | | PROJ. HT = TERRAIN HT |
| | | STORE MASKING DEPTH AT THIS POINT (ZVIS(J,ICOL)) |
| | | STORE PROJECTED HEIGHT IN WORKING ARRAY |
| | PROCESS FIRST COLUMN DOWN (SAME AS ABOVE) ||
| | PROCESS REST OF COLUMN TO EDGE OF DATA BASE (ICOL+IRL TO ICLIM) ||
| | INITIALIZE COLUMN COUNTER (IK=0) ||
| | DO I = ICOL+IRL, ICLIM, IRL ||
| | | INITIALIZE ROW COUNTER (IJ=-1) |
| | | INCREMENT COLUMN COUNTER (IK=IK+1) |
| | | DO J = JROW, MIN(JROW+IK, JUP) |
| | | | PROCESS UP TO 45 DEGREES |
| | | | INCREMENT ROW COUNTER (IJ=IJ+1) |
| | | | FIND PROJECTED HEIGHT AT THIS POINT |
| | | | ZP=ZOLD(J,MM)+ (ZOLD(J,MM)-ZZ+IJ*(ZOLD(J-1,MM)-ZOLD(J,MM))/(IK-1) |
| | | | IF PROJECTED HEIGHT IS LOWER THAN TERRAIN |
| | | | TRUE — ELSE |
| | | | SET PROJECTED HEIGHT = TERRAIN HEIGHT |
| | | | MASKING DEPTH = PROJ. HT — TERRAIN HT. |
| | | | STORE PROJECTED HEIGHT IN WORKING ARR |
| | | | CONTINUE PROCESS FOR POINTS ABOVE 45 DEGREES |
| | PROCESS COLUMN DOWN ||
| | SWAP COLUMN INDICES OF WORKING ARRAY (MM, NN) ||
| RETURN |||
| END |||

METHOD FOR DISPLAYING INTERVISIBILITY DATA

BACKGROUND OF THE INVENTION

This invention relates to data display and, more particularly, to a method for visually displaying intervisibility data relative to an observation point.

There are commercially available data bases of digitally stored terrain altitudes at grid points in terrestrial areas. Typically, such a data base comprises terrain altitudes in a square area of land mass of one degree latitude and one degree longitude, which is of the order of 100 km, and the grid points are spaced three arc seconds apart, which is of the order of magnitude of 100 meters.

One use of a terrain altitude data base is to determine intervisibility, i.e., whether a specified point on the surface of the earth is visible from an observation point, or if not, the height above the specified point that is visible from the observation point. There are presently computer algorithms for calculating intervisibility, i.e., line-of-sight between two points. These algorithms require complicated interpolation of the terrain altitude data base, essentially random access to the data base stored in computer memory, and a large number of calculations to develop intervisibility data relative to an observation point. The larger the terrestrial area under study is the processing time required to make the intervisibility data available for visual display.

There are a number of uses for a visual display of intervisibility data, including artillery placement, short-range air defense, ground surveillance and threat avoidance. These uses become more appealing and varied as the time and computer complexity required to produce the data decreases.

SUMMARY OF THE INVENTION

The invention is a method for presenting intervisibility data relative to an observation point on or above the terrain. A data base of terrain altitudes is stored in computer memory. The data base comprises terrain altitudes at a grid of points in a selected terrestrial area encompassing the observation point. Visible heights from the observation point at the grid points are derived from the data base with a computer by performing a number of steps grid point by grid point in succession in an order moving away from the observation point. The first step is to determine a projected height at the grid point from the visible heights between the observation point and the grid point. The second step is to compare the projected height with the terrain altitude at the grid point. The third step is select as the visible height at the grid point the larger of the compared terrain altitude and the projected height. A number representative of the visible height at each grid point as so derived with the computer is stored in computer memory. Preferably, the stored number is the difference between the visible height and the terrain altitude, which is known as the masking depth. The computer memory is coupled to a visual display device to present a representation of the stored number in spatial relationship coordinated with the spatial relationship of the grid points of the terrestrial area. By deriving the numbers representative of visible height grid point by grid point in succession in an order moving away from the observation point, computer memory can be accessed in an ordered fashion to retrieve terrain altitude data and store numbers representative of visible height data and the calculations to derive the visible height data can be simplified by building upon the previously calculated visible height data.

In a preferred embodiment of the invention, the visible height data is derived by use of the similar triangles theorem, i.e. similar triangles have proportional sides, and interpolation of previously calculated visible heights. Specifically, an intermediate terrain point is determined where a line from the observation point to the grid point in question crosses a line between the two closest intervening grid points. The visible height at the intermediate point is determined by interpolation of the visible heights at the closest intervening grid points based on the distance of the intermediate terrain point therefrom. The projected height at the grid point in question is then determined by similar triangles—one triangle is defined by the observation point, the intermediate point and the visible height at the intermediate point and the other triangle is defined by the observation point, the grid point in question and the projected height. In this way, the projected height is determined without use of trigonometric relationship or other complex calculations.

BRIEF DESCRIPTION OF THE DRAWINGS

The features of specific embodiments of the best mode contemplated of carrying out the invention are illustrated in the drawings, in which:

FIG. 6 is a pseudocode diagram in program design language of a computer program for deriving the visible heights at the grid points.

DETAILED DESCRIPTION OF THE SPECIFIC EMBODIMENT

Figure 1:
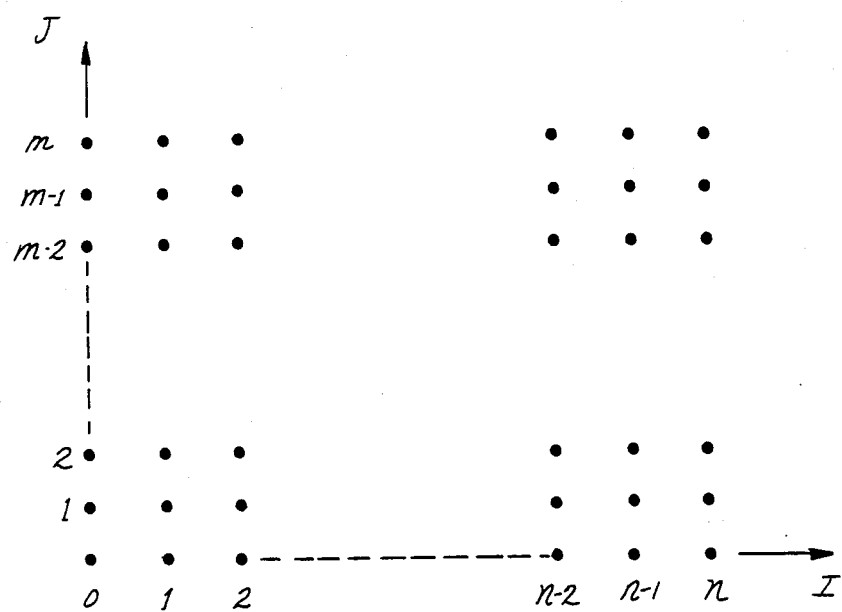
FIG. 1 is a diagram of grid of points in a given terrestrial area encompassing an observation point.

In FIG. 1, a selected terrestrial area is represented as a grid of points in a rectangular coordinate system having an I axis and a J axis. There are $n$ columns of grid points along the I axis and $m$ rows of grid points along the J axis for a total of $m$ times $n$ grid points. In a typical example, the distance between grid points is 100 meters, $n$ is 1000, $m$ is 1000 and there are a total of 1,000,000 grid points. For each grid point, a corresponding terrain altitude, referenced, for example, to sea level, is stored in computer memory in digital form. To facilitate access to computer memory, the terrain altitudes corresponding to adjacent grid points are preferably stored in adjacent cells of computer memory. In other words, the terrain altitudes are stored in columns and rows in computer memory corresponding to the columns and rows of grid points represented in FIG. 1. For purposes of simplification, the observation point O relative to which intervisibility is to be determined is the origin of the coordinate system.

Figure 2:
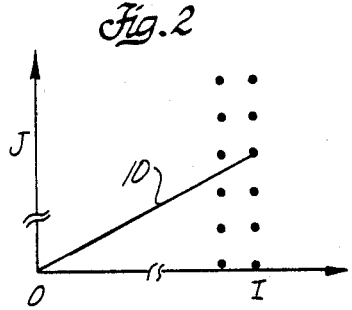
FIG. 2 is a diagram of part of the grid of FIG. 1 showing a line of sight from the observation point to a grid point at which the visible height is to be derived.

In FIG. 2, a line-of-sight 10 from observation O to a grid point (J, I) in row J and column I of the grid defines the visible height to be derived. The visible heights from observation point O are calculated grid point by grid point in succession in an order moving away from observation point O. Preferably, the visible heights are calculated column by column moving away from observation point O; within each column the visible heights are generated grid point by grid point moving up the column in order from the I axis. A number representative of each visible height is stored in computer memory. Preferably, the stored number is the difference between the visible height and the terrain altitude, i.e., the masking depth, which is the minimum height above the terrain at the grid point in question at which an object, for example, a low-flying airplane would become visible from observation point O. The numbers representative of the visible heights calculated in the described order are also stored in computer memory in the same order, so as to facilitate access to the visible height data, i.e., the visible height data for successive grid points are stored in successive cells of computer memory so the order of storage in memory corresponds to the physical ordering of the grid points in the selected terrestial area. This minimizes any shifting of data in and out of the working memory, which is a time-consuming process.

Figure 3:
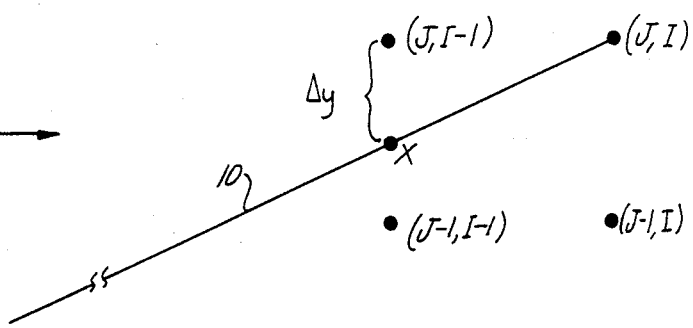
FIG. 3 is a diagram of an enlargement of part of FIG. 2.

In FIG. 3 the closest intervening grid points to the grid point in question (J, I), i.e, the grid point at which the visible height is being calculated, are grid points (J, I−1) and grid point (J−1, I−1). Line-of-sight 10 crosses an imaginary line between grid point (J, I−1) and grid point (J−1, I−1) at an intermediate terrain point X spaced from data point (, I−1) by a distance Δy. In order to determine the visible height at the grid point in question, the visible height at intermediate terrain point X is first determined by interpolation of the already determined visible heights at grid point (J, I−1) and grid point (J−1, I−1). From the theorem of similar triangles, the following equation is derived:

$$\frac{J}{I} = \frac{J - \Delta y}{I - 1} \quad (1)$$

By interpolation, the following equation is derived for the visible height at the intermediate point X:

$$\overline{Z} = \Delta y\, Z(J-1, I-1) + (1 - \Delta y) Z(J, I-1), \quad (2)$$

where $\overline{Z}(J-1, I-1)$ is the visible height at grid point $(J-1, I-1)$ and $\overline{Z}(J, I-1)$ is the visible height at grid point $(J, I-1)$.

By substitution, the following equation for the height at the intermediate point X is derived from equations (1) and (2):

$$Z = \frac{J}{I} Z(J - 1, I - 1) + \left(\frac{I - J}{I}\right) Z(J, I - 1) \quad (3)$$

Figure 4:
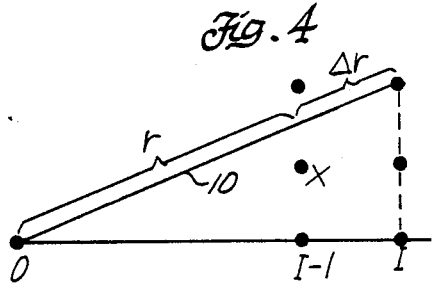
FIG. 4 is a diagram of a horizontal plane triangle defined by the observation point, the grid point of the visible height being derived and one coordinate component of such grid point.

FIG. 4 illustrates two similar triangles defined by line-of-sight 10 in the terrestrial, i.e., horizontal plane. One triangle is defined by observation point O, the grid point in question and the intersection of the column in question with the I axis. The other triangle is formed by observation point O, intermediate terrain point X and the point where the previous column intersects the I axis. The distance along line-of-sight 10 from observation point O to intermediate terrain point X is designated r and the distance along the observation point from intermediate terrain point X to the grid point in question is designated Δr. From the similar triangles theorem, the following equation is derived:

$$\frac{r + \Delta r}{r} = \frac{I}{I - 1} \quad (4)$$

Figure 5:
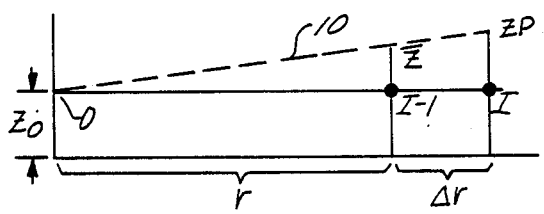
FIG. 5 is a diagram of a vertical plane triangle defined by the observation point, the projected height and the grid point of the visible height being derived.

FIGS. 1 to 4 all represent horizontal plane diagrams. FIG. 5 is a diagram in the vertical plane that represents two similar triangles. The terrain altitude of observation point O is $Z_o$. One triangle is defined by observation point O, the grid point in question and the projected height ZP at the grid point in question along line-of-sight 10. The other triangle is defined by observation point O, the visible height at intermediate terrain point X derived by interpolation according to equation (3), and intermediate terrain point X. From the theorem of similar triangles, the following equation is derived:

$$\frac{ZP - Z_o}{Z - Z_o} \frac{r + \Delta r}{r} \quad (5)$$

By substitution, the following equation is derived from equations (4) and (5):

$$ZP = \frac{I}{I - 1} [-Z_o + J\, Z(J - 1, I - 1) + \quad (6)$$
$$(I - J)\, Z(J, I - 1)]$$

The projected height ZP at the grid point in question is compared with the terrain altitude at the grid point in question. The larger of the two is selected as the visible height at the grid point in question. A number representative of the visible height is stored in computer memory in the cell corresponding to the grid point in question. Preferably, this number is the difference between the visible height and the terrain altitude, i.e., the masking depth. But it could also be the visible height per se or some other quantity derived therefrom. In the described manner, the visible height is derived for each grid point in the selected terrestrial area, grid point by grid point in succession in an order moving away from observation point O.

It is preferable from the point of view of accuracy of the calculations only to use use equation (6) to generate the visible height values for grid points for which the line-of-sight forms less than a 45° angle with the I axis. For grid points for which the line-of-sight forms an angle of less than 45° with the J axis, the following equation is preferably used to derive the visible height data:

$$ZP = \frac{I}{J - 1} [-Z_o + I\, Z(J - 1, I - 1) + \quad (7)$$
$$(J - I)\, Z(J - 1, I)]$$

Computer memory may be coupled to a visible display device, which presents a visual representation of the stored visible heights in spatial relationship coordinated with the spatial relationship of the grid points of the selected terrestrial area. The representation of the visible height data can take various forms. For example, different shades of gray can represent different values of visible height—white for a visible height equal to the terrain altitude (i.e., the terrain being visible at the grid point in question from the observation point) and increasing shades of gray for increasingly larger visible heights with respect to observation point O. In one preferred embodiment, the visible height data is displayed in terms of masking depth, which is the visible height minus the terrain altitude. In physical terms, this represents the minimum height above the terrain at the grid point in question at which an object, for example, a low flying airplane would become visible from observation point O. Another representation could be binary in nature—black for terrain data points that are visible from observation point O and white for terrain points that are not visible from observation point O. Yet another representation could be in terms of color bands—for example, terrain areas having a masking depth of 60 meters or less could be represented by the color green, terrain areas having a masking depth between 60 and 150 meters could be represented by the color yellow, and terrain areas having a masking depth greater than 150 meters could be represented by black. Further, the representation of the visible height data could be superimposed upon a shaded relief map of the selected terrestrial area or other data displays pertaining thereto.

As used herein the term "computer memory" refers to any memory device accessible by a computer, not necessarily computer memory that is physically part of the computer itself performing the calculations.

The invention is designed to be implemented with a computer and is particularly well suited for implementation with a microcomputer such as an APPLE or IBM personal computer. FIG. 6 is a diagram of a program in program design language for deriving visible height data in accordance with the principles of the invention.

The described embodiment of the invention is only considered to be preferred and illustrative of the inventive concept; the scope of the invention is not to be restricted to such embodiments. Various and numerous other arrangements may be devised by one skilled in the art without departing from the spirit and scope of this invention.

For example, instead of being at the ground surface, the observation point could be above the ground surface in which case the invention could serve to enable a pilot to determine terrain areas from which he is visible and thus vulnerable to attack. Instead of being arranged in a rectangular coordinate system the grid points could be arranged in a different coordinate system such as a polar coordinate system.

What is claimed is:

1. A method for presenting intervisibility data relative to an observation point comprising the steps of:
    storing in a computer memory a data base of terrain altitudes at a grid of points in a selected terrestrial area encompassing the observation point;
    deriving from said data base visible heights from the observation point at the grid points by performing, grid point by grid point in succession in an order moving away from the observation point, using a computer, the steps of:
    (a) determining, from the visible heights between the observation point and the grid point, a projected height at the grid point;
    (b) comparing the projected height with the terrain altitude at the grid point; and
    (c) selecting, as a visible height at the grid point, the larger of the compared terrain altitude and projected height;
    storing representations of the visible heights in computer memory; and
    coupling said computer memory to a visual display device to present the stored representations in spatial relationship coordinated with the spatial relationship of the grid points of the terrestrial area.

2. The method of claim 1, in which the determining step comprises:
    (i) determining an intermediate terrain point where a line from the observation point to said grid point crosses a line between the two closest intervening grid points;
    (ii) determining the visible height at the intermediate point by interpolation of the visible heights at the closest intervening grid points based on the distance of the intermediate terrain point therefrom; and
    (iii) determining the projected height at said grid point by similar triangles, one triangle defined by the observation point, the intermediate point, and the visible height at the intermediate point and the other triangle defined by the observation point, said grid point and the projected height being determined.

3. The method of claim 1, in which the grid points are arranged in rows and columns defining a rectangular coordinate system and the deriving step derives the visible heights in an order moving away from the observation point column by column and within a column successively from the closest data point to the observation point to the furthest data point from the observation point.

4. The method of claim 1, in which the grid points are arranged in rows and columns defining a rectangular coordinate system and the deriving step derives the visible heights in an order moving away from the observation point row by row and within a row successively from the closest data point to the observation point to the furthest data point from the observation point.

5. The method of claim 1, in which the deriving step derives visible heights moving away from the observation point column by column for grid points the line-of-sight of which forms an angle of about less than 45° with the axis parallel to the rows.

6. The method of claim 5, in which the deriving step derives visible heights moving away from the observation point row by row for grid points the line of sight of which forms an angle of about less than 45° with the axis parallel to the columns.

7. The method of claim 1, in which computer memory comprises cells arranged according to an order and the visual heights are stored in the cells of computer memory in an order corresponding to the physical ordering of the grid points in the terrestrial area.

8. The method of claim 1, in which the representation of the visible height of each grid point stored in computer memory is a number equal to the difference between the visible height and the terrain altitude at such grid point.

9. A method for deriving intervisibility data relative to an observation point from a data base of terrain altitudes at a grid of points in a selected terrestrial area encompassing the observation point, the method comprising the steps of:
    storing in a computer memory the data base of terrain altitudes;
    deriving from said data base visible heights from the observation point at the grid points by performing, grid point by grid point in succession in an order moving away from the observation point, using a computer, the steps of:

(a) determining, from the visible heights between the observation point and the grid point, a projected height at the grid point;

(b) comparing the projected height with the terrain altitude at the grid point; and (c) selecting, as a visible height at the grid point, the larger of the compared terrain altitude and projected height; and storing representations of the visible heights in said computer memory.

10. The method of claim 9, in which the representation of the visible height of each grid point stored in computer memory is a number equal to the difference between the visible height and the terrain altitude at such grid point.

11. The method of claim 10, in which computer memory is organized into cells and the step of storing the visible heights comprises storing visible heights at adjacent grid points in the selected terrestrial area in adjacent cells of computer memory.

12. The method of claim 11, in which the step of storing the data base in computer memory comprises storing terrain altitudes at adjacent grid points in the selected terrestrial area in adjacent cells.

* * * * *